United States Patent [19]

Oace

[11] Patent Number: 5,518,532
[45] Date of Patent: May 21, 1996

[54] VAPOR FILTER WITH PARTIAL BYPASS AND METHOD OF MANUFACTURE

[75] Inventor: Jon R. Oace, Portland, Oreg.

[73] Assignee: Research Industries, Inc., Portland, Oreg.

[21] Appl. No.: 336,930

[22] Filed: Nov. 10, 1994

[51] Int. Cl.$^6$ .................................................. B01D 46/10
[52] U.S. Cl. .................................. 96/134; 96/153; 55/515
[58] Field of Search ........................... 96/134, 153, 154; 55/515, 516

[56] References Cited

U.S. PATENT DOCUMENTS

| | | | |
|---|---|---|---|
| 2,210,862 | 8/1940 | Tronstad | 55/274 |
| 2,578,324 | 12/1951 | Southwick, Jr. | 96/153 |
| 2,649,923 | 8/1953 | Woppman . | |
| 3,616,604 | 11/1971 | Schouw | 55/515 |
| 3,739,558 | 6/1973 | Hurson | 55/515 |
| 4,904,288 | 2/1990 | d'Augereau | 55/515 |
| 4,917,862 | 4/1990 | Kraw et al. | 96/134 |
| 5,069,694 | 12/1991 | Cullen et al. | 96/154 |

FOREIGN PATENT DOCUMENTS

| | | | |
|---|---|---|---|
| 394782 | 5/1924 | Germany | 55/515 |
| 54-162278 | 12/1979 | Japan | 96/134 |

*Primary Examiner*—Tim R. Miles
*Attorney, Agent, or Firm*—Smith-Hill and Bedell

[57] ABSTRACT

Filter apparatus comprises a wall defining a chamber and a filter device mounted between an air inlet of the chamber and an air outlet thereof for filtering air passing therethrough. The filter device comprises a stiff frame defining an opening, and tubular pockets made of open weave mesh material. The pockets extend across the opening in spaced parallel relationship and contain vapor filter material.

16 Claims, 2 Drawing Sheets

VAPOR FILTER WITH PARTIAL BYPASS AND METHOD OF MANUFACTURE

BACKGROUND OF THE INVENTION

This invention relates to a vapor filter with partial bypass.

A forced air central air conditioning system (which term, as used herein, includes a heating and/or cooling system) of conventional construction comprises a plenum having a downstream end from which air distribution ducts extend, an upstream end for receiving return air, a heat exchanger disposed between the upstream end of the plenum and the downstream end thereof, and a blower between the upstream end of the plenum and the heat exchanger for establishing a flow of air from the upstream end of the plenum over the heat exchanger to the downstream end of the plenum.

It is usual for a particulate filter device to be mounted just upstream of the blower in order to protect the blower and heat exchanger from accumulation of dust and other airborne particles, which would impair the efficiency of the blower and heat exchanger and might even give rise to a risk of fire.

A figure of merit for the particulate filter device that is installed in a domestic forced air central air conditioning system is the ASHRAE efficiency designation. The ASHRAE efficiency designation for filter devices that are commonly sold for domestic use is often as low as 5%. Even with such a low ASHRAE efficiency designation, these filter devices do an adequate job of protecting the blower and heat exchanger from particulate accumulation. A low ASHRAE efficiency designation has the advantage that the filter device does not present a high flow resistance, which would result in a high load being imposed on the blower.

The typical filter device installed in a domestic forced air central air conditioning system comprises a frame of cardboard and a web of porous material supported in the frame. The filter device may also comprise a support web to retain the filter web in position against the force applied to the filter web during operation of the blower.

It has in recent years been recognized that indoor air pollution can have significant health consequences. Most indoor air pollutants can be classified either as particles or as vapors. The conventional filter device of a domestic forced air central air conditioning system, having an ASHRAE efficiency designation of about 5%, does an acceptable job in removing fairly large particles, such as household dust, but it does not retain smaller particles, such as those present in cigarette smoke, or vapors.

It is known to use activated carbon as a vapor filter. In principle, it would be possible to place a bed of activated carbon over the filter web of a filter device for use in a domestic forced air central air conditioning system, but the flow resistance of the modified filter device would likely place an unacceptable load on the blower. It has therefore been proposed to employ a partial bypass filter, in which some of the air passing through the filter device contacts the activated carbon and some bypasses the activated carbon.

It is known to construct an activated carbon filter with a partial bypass by using tubes of perforated sheet metal filled with activated carbon and arranged in spaced parallel relationship across an air flow duct. Some of the air passes between the tubes, while other air passes through the perforations in the walls of the tube and is exposed to the activated carbon inside the tube. This type of filter is costly to manufacture because the perforated sheet metal is expensive.

Typically, the mounting structure for the particulate filter device installed in a domestic forced air central air conditioning system will accommodate a rectangular filter device having a thickness no greater than about 2.5 cm. In order to install a vapor filter with partial bypass in such a system without modifying the mounting structure, the vapor filter device must have substantially the same overall dimensions as the conventional particle filter.

SUMMARY OF THE INVENTION

In accordance with a first aspect of the present invention there is provided filter apparatus comprising a wall means defining a chamber having an air inlet and an air outlet, and a filter device mounted between the air inlet and the air outlet for filtering air passing from the air inlet to the air outlet, said filter device comprising a stiff frame defining an opening, and a plurality of tubular pockets made of open weave mesh material, said pockets extending across the opening in spaced parallel relationship and each containing vapor filter material.

In accordance with a second aspect of the present invention there is provided a filter device comprising a frame means defining an opening, and a composite filter medium mounted in the opening for filtering air passing therethrough, said composite filter medium comprising a web of particulate filter medium extending over substantially the entire area of the opening, and a plurality of tubular pockets of open weave mesh material, said pockets extending across the opening in spaced parallel relationship and each containing vapor filter medium.

In accordance with a third aspect of the present invention there is provided a method of manufacturing a vapor filter, comprising providing a web of mesh material, forming a trough in the web of mesh material, the trough having two sides, and placing vapor filter medium in the trough and securing the two sides of the trough together.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

FIG. 1 illustrates a web 2 of flexible mesh material, such as fiberglass insect screen, in the form of a supply roll 4. This type of insect screen comprises glass fiber strands coated with thermoplastic material. The roll 4 is free to rotate about its central axis subject to the action of a brake (not shown). The web is drawn from the supply roll 4 over a table 6 by the action of pinch rolls (not shown), which are intermittently driven by a motor (not shown). A sensor 10 measures the length of web that has been drawn from the supply roll and stops the motor, and engages the brake, when that length reaches a preset limit. In this manner, the web is drawn from the supply roll in equal length increments. The lengths of web that have passed over the table and leave the pinch rolls are deposited in a bin (not shown).

Figure 1A:
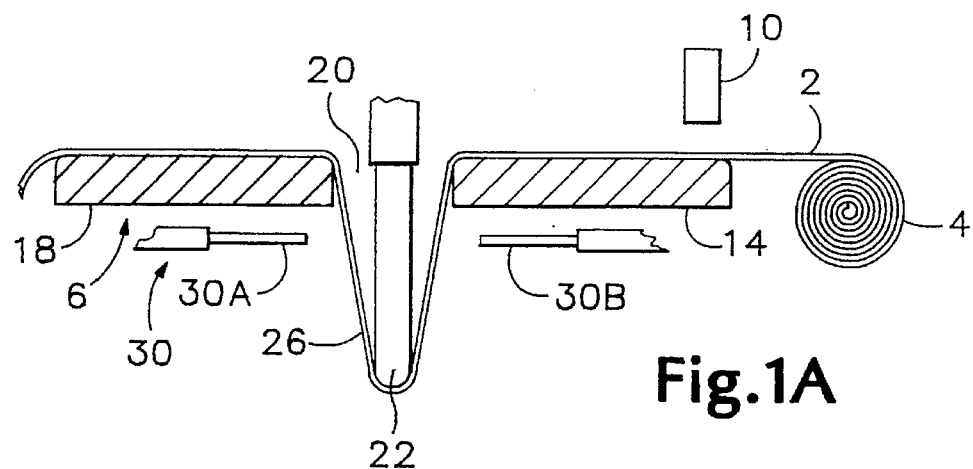
FIGS. 1A–1C are respective schematic views of a machine for manufacturing an activated carbon filter medium, at different stages in operation of the machine.
Figure 1B:
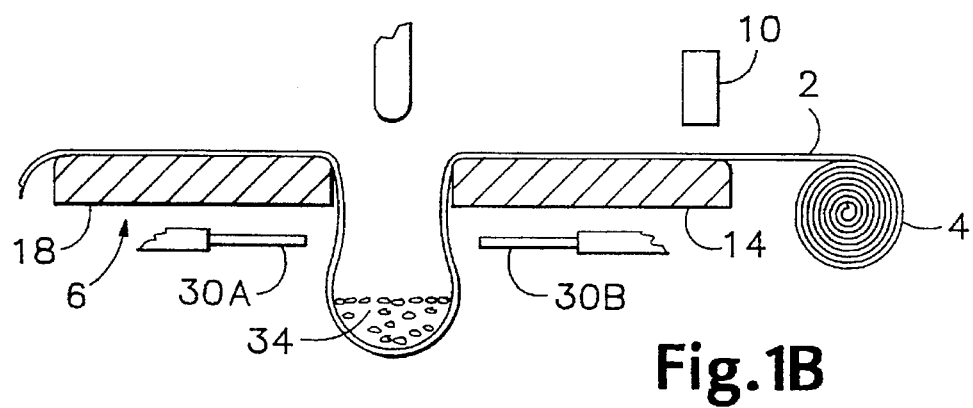
Figure 1C:
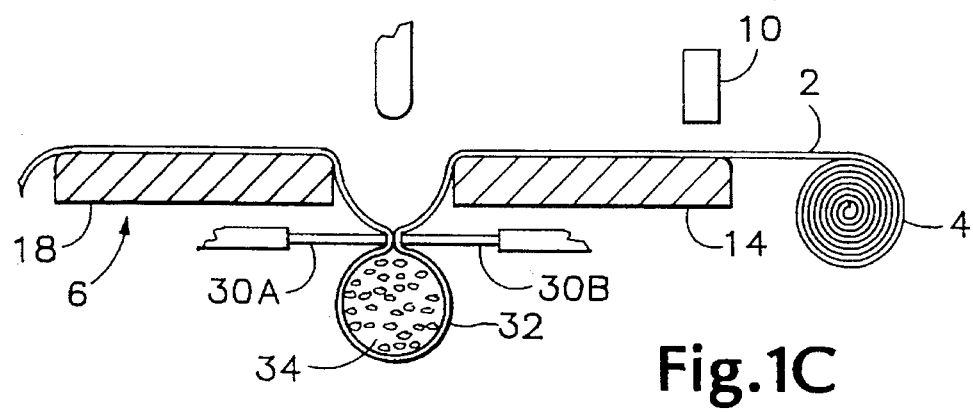
Figure 2:
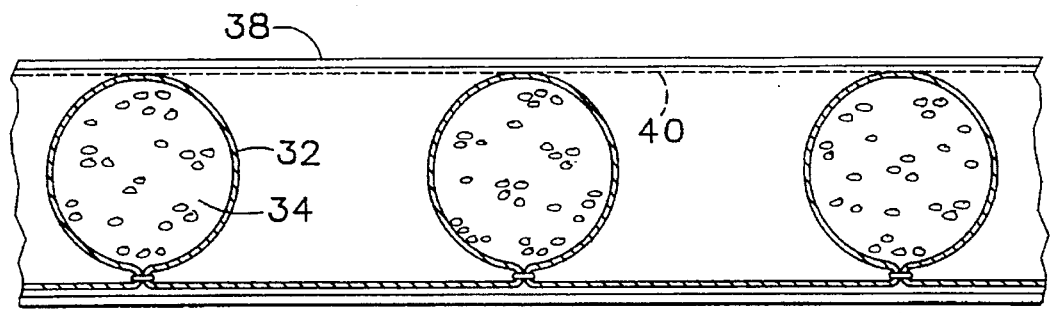
FIG. 2 is a partial sectional view of a filter device incorporating a first filter medium in accordance with the present invention.

The table comprises two leaves 14 and 18 that are separated by a gap 20. Over the gap 20 there is a bar 22, which extends parallel to the edges of the leaves 14 and 18. When the supply roll 4 is held by the brake, the bar 22 is pushed downwards between the leaves 14 and 18. Web material is thereby pulled back from the bin over the leaf 18 and a trough 26 is formed in the web 2 beneath the table 6 (FIG. 1A). The bar 22 is then raised, leaving the trough empty. A predetermined quantity of granulated activated carbon 34 is placed in the trough (FIG. 1B) and a cylindrical plug (not shown) of soft plastic foam material is placed in the trough at each end. For a reason that will shortly become apparent, the plugs are longitudinally compressed at the time of installation. The activated carbon is spread out uniformly lengthwise of the trough, and the two sides of the trough 26 are then secured together by a heat sealing device 30 that is located immediately beneath the leaves 14 and 18. The heat sealing device comprises two heated plates 30A and 30B that are brought together and melt the thermoplastic material of the mesh along a transverse line, and on retracting the plates the two sides of the trough are bonded together. In this manner the trough is formed into a closed pocket 32 (FIG. 1C). Preferably, there is a little excess carbon in the trough when the two sides of the trough are bonded together, so that when the heated plates are forced together, the web is placed under a small tension and there is no void space inside the pocket that would allow shifting or settling of the granules during transportation. The size of the granules is greater than the aperture size of the mesh material, so that the granules are retained in the pocket. The web is then advanced again by the pinch rolls. The length of the increment by which the web is advanced exceeds the length of web that is used to form the pocket by an amount L (FIG. 2). In this manner, the pocket containing the activated carbon 34 is withdrawn from between the leaves 14 and 18 and a new strip of web material is positioned on the downstream side of the leaf 14. As the bar 22 is pushed downwards again, web material is drawn back from the bin. The sequence of operations described above is repeated, and the mesh material is thereby formed into a web of activated carbon filter material comprising pockets of mesh material that are parallel to one another and are spaced apart from each other along the web.

After installation of the compressed foam plastic plugs in the trough, the plugs will expand somewhat longitudinally, resisting creation of a void in the pocket.

Figure 3:
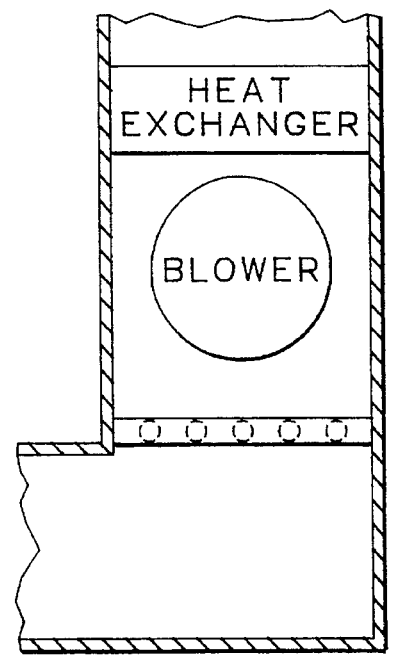
FIG. 3 is a partial sectional view of a central air conditioning system equipped with a filter device of the kind shown in FIG. 2.

Referring to FIG. 2, a length is cut from the web of activated carbon filter material and is fitted in a cardboard or metal frame 38, similar to those that are used in conventional filter devices, with a web 40 of particulate filter material. The pockets 32 containing activated carbon are sufficiently small that the activated carbon filter can be accommodated with the particulate filter within the dimensions of the cardboard or metal frame 38. The resulting filter device can then be installed in a domestic forced air central air conditioning system, as shown in FIG. 3, in lieu of a conventional filter device.

The filter device shown in FIG. 2 provides an activated carbon filter with a partial bypass. When an air flow is forced through the filter device, the pockets 32 create a turbulent flow, ensuring that air enters the pockets and contacts the activated carbon therein. Some of the air that passes through the filter device passes between the pockets without contacting the activated carbon. The bypass ratio depends on the spacing between the pockets, so that by increasing the spacing, the bypass ratio increases. By increasing the bypass ratio, the flow resistance presented by the filter device is reduced. Conversely, by reducing the dimension L to the diameter of the pockets, the bypass ratio can be reduced to zero, so that all air that passes through the filter device is exposed to activated carbon. An alternative way to reduce the bypass ratio to zero is to select L equal to twice the diameter of the pockets and fit two filter devices in the frame with the two sets of pockets in interdigitating relationship.

It will be appreciated that the filter device shown in FIG. 2 serves not only to protect the blower and heat exchanger from accumulation of dust and other airborne particles that might impair their efficiency, but also to remove at least some of the smaller particles and vapors that contribute to indoor air pollution.

Figure 2A:
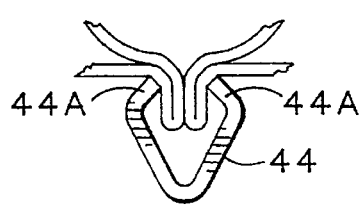
FIG. 2A is an enlarged view of a modification of FIG. 2.

A modification of the activated carbon filter medium is shown in FIG. 2A. In accordance with FIG. 2A, the two sides of the trough are not secured by heat sealing but are held together by a strip 44 of aluminum. The strip is roll formed with a profile similar to that shown in FIG. 2A, except that the two edges 44A are somewhat farther apart, and the two sides of the trough 26 are pushed together by plates (not shown) that are inclined upwardly into the gap between the table leaves 14 and 18, providing two creases in the web, at the two opposite sides of the trough respectively. The strip 44 is placed over the creases and is crimped, so that the edges 44A grip the two creases. The longitudinal folds in the strip 44 of aluminum impart strength to the strip, so that it effectively resists bending perpendicular to the general plane of the filter medium, and accordingly the aluminum strip imparts dimensional stability to the filter medium.

In the event that width of the web 2 exceeds the corresponding dimension of the desired activated carbon filter, an intermediate plug may be placed partway along the trough, whereby the trough is divided into two segments, and a quantity of activated carbon placed in each segment of the trough. The two sides of the trough are secured together in the manner described with reference to FIG. 2A, and when the sides have been secured together, the web is slit longitudinally, cutting through the strips 44 and the intermediate plugs and dividing the filter medium into two strips. In this manner, wastage of mesh material may be reduced.

Figure 4:
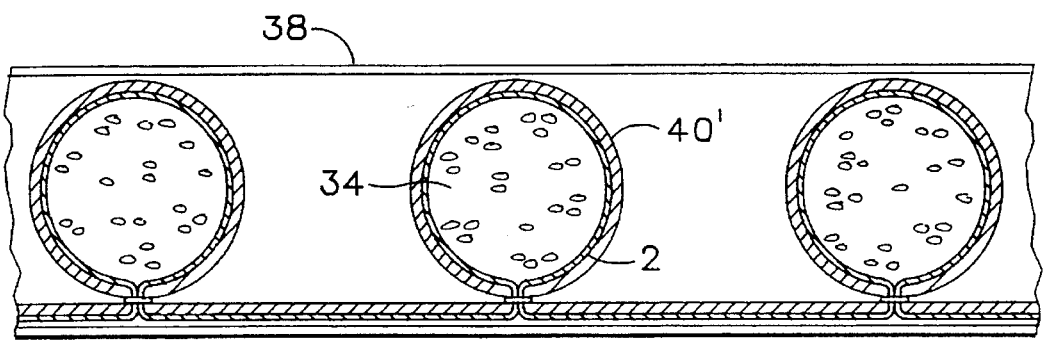
FIG. 4 is a partial sectional view of a filter device incorporating a second filter medium in accordance with the present invention.

FIG. 4 illustrates a modification of the filter medium shown in FIG. 2. In accordance with FIG. 4, webs of both mesh material 2 and particulate filter material 40' are provided to the table 6, so that the pockets are formed not only by the mesh material but also by the particulate filter material. The FIG. 4 modification has the advantage that the area of particulate filter material is increased relative to the construction shown in FIG. 2. This allows use of a particulate filter material that has a higher ASHRAE efficiency designation than the particulate filter material that is conventionally employed in the filter device of a domestic forced air central air conditioning system without placing an unacceptable load on the blower. The particulate filter material 40' preferably has an ASHRAE efficiency designation of about 30 percent. Accordingly, the filter device shown in FIG. 4 not only removes vapors and smaller particles but also removes larger particles more efficiently than a conventional filter device. The mechanism whereby the two sides of the trough are secured together is not shown in FIG. 4, but it is preferred that crimping be employed.

It will be appreciated that the invention is not restricted to the particular embodiments that have been described, and that variations may be made therein without departing from the scope of the invention as defined in the appended claims and equivalents thereof. For example, the invention is not restricted to the use of heat sealing or crimping to form the pockets, and numerous other mechanisms, such as stitching or hot melt adhesive, may be used instead.

I claim:

1. Filter apparatus comprising:

a wall means defining a chamber having an air inlet and an air outlet, and a filter device mounted between the air inlet and the air outlet for filtering air passing from the air inlet to the air outlet, said filter device comprising a stiff frame defining an opening, a plurality of tubular pockets made of open weave mesh material, said pockets extending across the opening and each containing granular vapor filter material, and two cylindrical plugs in each pocket at opposite respective ends thereof, said plugs holding the vapor filter medium in the pocket in a compacted state.

2. Apparatus according to claim 1, wherein the pockets of open weave mesh material extend across the opening in spaced parallel relationship and are separated by respective strips of a web of particulate filter material that extends over substantially the entire area of the opening.

3. A filter device comprising:

a frame means defining an opening, and a composite filter medium mounted in the opening for filtering air passing therethrough, said composite filter medium comprising a web of particulate filter medium extending over substantially the entire area of the opening, a plurality of tubular pockets of open weave mesh material, said pockets extending across the opening in spaced parallel relationship and each containing granular vapor filter medium, and two cylindrical plugs in each pocket at opposite respective ends thereof, said plugs holding the vapor filter medium in the pocket in a compacted state.

4. A filter device according to claim 3, wherein the open weave mesh material is in the form of a web that is substantially coextensive with the web of particulate filter medium.

5. A filter device according to claim 3, comprising a plurality of strips of metal extending across the opening in spaced parallel relationship, the strips of metal being crimped to the open weave mesh material along the pockets respectively, whereby the strips of metal both stiffen the filter device and hold the pockets closed.

6. A method of manufacturing a vapor filter, comprising:

providing a web of mesh material, providing a web of particulate filter medium extending coextensively with the web of mesh material, forming a trough in the web of mesh material and the web of particulate filter medium, the trough having two sides, and placing vapor filter medium in the trough and securing the two sides of the trough together.

7. A method according to claim 6, comprising securing the two sides of the trough together by stitching.

8. A method according to claim 6, comprising securing the two sides of the trough together by crimping between opposite edges of a strip of metal.

9. A method according to claim 6, comprising securing the two sides of the trough together by heat sealing.

10. A method according to claim 6, comprising securing the two sides of the trough together by hot melt adhesive.

11. A method according to claim 6, wherein the vapor filter medium is granular, and the method comprises placing a cylindrical plug in each end of the trough, and pushing the plugs together after the vapor filter medium has been placed in the trough and the two sides of the trough have been secured together, whereby the vapor filter medium is compacted.

12. A method according to claim 11, comprising compressing the plugs before placing them in the trough.

13. A method of manufacturing a vapor filter, comprising:

providing a web of mesh material, forming a trough in the web of mesh material, the trough having two sides and two ends, placing granular vapor filter medium in the trough between the two ends thereof, placing two cylindrical plugs in the trough between the vapor filter medium and the two ends respectively, and securing the two sides of the trough together.

14. A method according to claim 13, comprising pushing the plugs together after the vapor filter medium has been placed in the trough and the two sides of the trough have been secured together, whereby the vapor filter medium is compacted.

15. A method according to claim 13, comprising compressing the plugs before placing them in the trough.

16. A method of manufacturing a vapor filter, comprising:

providing a web of mesh material, forming a trough in the web of mesh material, the trough having two sides and two ends, placing vapor filter medium in the trough, closing the sides of the trough together at upper edges of said two sides, placing a strip of metal of length substantially equal to the distance between said two ends of the trough over said upper edges, and crimping opposite edges of the strip of metal together over said upper edges, whereby the two sides of the trough are secured together and the metal strip lends stiffness to the vapor filter.

* * * * *